United States Patent [19]
Laas et al.

[11] Patent Number: 5,811,190
[45] Date of Patent: Sep. 22, 1998

[54] MATT POLYURETHANE POWDER COATINGS AND THEIR USE FOR COATING HEAT RESISTANT SUBSTRATES

[75] Inventors: Hans-Josef Laas, Köln; Hans-Ulrich Meier-Westhues, Leverkusen; Reinhard Halpaap, Odenthal; Ulrich Freudenberg, Pulheim; Hans-Peter Klee, Burscheid, all of Germany

[73] Assignee: Bayer Aktiengesellschaft, Leverkusen, Germany

[21] Appl. No.: 794,256

[22] Filed: Jan. 31, 1997

[30] Foreign Application Priority Data

Feb. 8, 1996 [DE] Germany .................. 196 04 581.9

[51] Int. Cl.$^6$ .............. C08L 33/06; C08L 67/02; C08L 75/04
[52] U.S. Cl. ............ 428/423.1; 525/111; 525/123; 525/124; 525/131; 525/438; 525/440; 525/454; 525/934
[58] Field of Search ................ 525/111, 123, 525/124, 131, 438, 440, 454, 934; 428/423.1

[56] References Cited

U.S. PATENT DOCUMENTS

| | | | |
|---|---|---|---|
| 3,842,035 | 10/1974 | Klaren | 260/47 EN |
| 4,463,154 | 7/1984 | Disteldorf et al. | 528/45 |
| 4,782,128 | 11/1988 | Gras et al. | 528/45 |
| 4,900,800 | 2/1990 | Halpaap et al. | 528/66 |
| 4,920,173 | 4/1990 | Gras | 524/590 |
| 5,310,848 | 5/1994 | Nozaki et al. | 528/45 |
| 5,538,759 | 7/1996 | Hoppe | 525/440 |

FOREIGN PATENT DOCUMENTS

| | | |
|---|---|---|
| 2177027 | 11/1996 | Canada . |
| 2147653 | 4/1973 | Germany . |
| 3232463 | 3/1984 | Germany . |
| 3328129 | 2/1985 | Germany . |
| 3328133 | 2/1985 | Germany . |
| 92/01756 | 2/1992 | WIPO . |

*Primary Examiner*—Patricia A. Short
*Attorney, Agent, or Firm*—Joseph C. Gil; Thomas W. Roy

[57] ABSTRACT

The present invention relates to a powder coating composition for the production of matt coatings containing as binder A) a component having hydroxyl groups,
B) a polyisocyanate having blocked and optionally free isocyanate groups,
C) a component having carboxyl groups and/or carboxylic anhydride groups and contains one or more of the following:
  C1) aliphatic and/or cycloaliphatic dicarboxylic acids having 4 to 20 carbon atoms,
  C2) monomeric and/or polymeric anhydrides of dicarboxylic acids C1) and
  C3) aliphatic hydroxycarboxylic acids having 4 to 18 carbon atoms, and
D) a component which has groups that are reactive with carboxyl groups and/or carboxylic anhydride groups
wherein components A), B), C) and D) are present in amounts such that
  1) 0.6 to 1.4 isocyanate groups of component B) are present for each hydroxyl group of component A),
  2) 0.3 to 1.5 groups of component D) that are reactive with carboxyl groups and/or carboxylic anhydride groups are present for each carboxyl equivalent of component C) and
  3) components C) and D) are present in an amount of 10 to 40 wt. %, based on the total weight of components A), B), C) and D).

The invention further relates to heat resistant substrates coated with this powder coating composition.

20 Claims, No Drawings

MATT POLYURETHANE POWDER COATINGS AND THEIR USE FOR COATING HEAT RESISTANT SUBSTRATES

BACKGROUND OF THE INVENTION

1. Field of the Invention

The present invention relates to powder coating compositions for the production of matt coatings and to heat resistant substrates coated with these powder coating compositions.

2. Description of the Prior Art

Along with the development of high-solids lacquers and aqueous coating compositions, the development of powder coating compositions has gained increasingly in importance in recent years. Powder coating compositions do not release any harmful solvents in the course of application, they can be processed with very high utilization of material and, therefore, they are regarded as very environmentally friendly and economical.

Particularly high-quality, light-resistant and weather-resistant coatings can be produced with thermosetting powder coating compositions based on polyurethanes. The polyurethane (PUR) powder coating compositions that have become established on the market today are generally based on solid polyester polyols which are cured with solid aliphatic or cycloaliphatic polyisocyanates, generally in blocked form.

For various applications, for example for the coating of office furniture, electrical and electronic appliances or for purely decorative coatings, there is great interest in powder coating compositions which cure to form in matt surfaces. Also, glossy, strongly reflecting coatings are frequently undesirable for coating facades, e.g., the surfaces of buildings. Therefore, there have been many attempts to develop matt PUR powder coatings.

The incorporation of finely divided mineral or polymeric delustering agents, which is customary in liquid for reducing the degree of gloss, does not generally achieve the desired result in powder coatings; the coatings increasingly lose mechanical properties with increasing content of the delustering agent. The "dry" mixing of two separately produced powder coating compositions which are formulated so as to have the same color and which are based on different binding agents, described in DE-A 2,147,653 and 2,247,779, produces results which are not very satisfactory. Particularly in those cases where coating overspray is to be recycled, the matt effects that are achievable in this way can only be reproduced poorly.

Polyurethane powder coating compositions which cure reproducibly to form matt coatings are obtained in accordance with, e.g, DE-A 3,338,129, from polyester polyols and ε-caprolactam-blocked polyisocyanate crosslinking agents based on isophorone diisocyanate (IPDI) with the simultaneous addition of high melting pyromellitic dianhydride (m.p.: 284°–286° C.). Powder coatings with a low degree of gloss are also obtained if polyester polyols are combined with special ε-caprolactam-blocked derivatives of trans-1, 4-diisocyanatocyclohexane having a melting range above 140° C., as described, for example, in DE-A 3,711,374, or with polyaddition compounds based on IPDI uretdione polyisocyanates having melting points above 130° C., preferably above 140° C., as described in DE-A 3,328,133.

The powder coating compositions described in these publications have in common the fact that they each contain a reaction component having a melting point, which is clearly above the extrusion temperatures that are conventional in connection with the production of powder coatings (in general 80° to 120° C.). The matt effects that can be achieved are based in all cases on an unsatisfactory mixing of the reaction partners during the extrusion of the melt. The coatings obtained from these powder coating compositions generally only have only moderate lacquer properties because of the inhomogeneities present in the powder coating compositions.

The use of mixtures of blocked polyisocyanates and polyepoxide crosslinking agents having special carboxyl groups, such as triglycidyl isocyanurate (TGIC), as curing agents for pulverulent hydroxy-functional binding agents is described in DE-A 3,232,463. Although such "3-component" powder coating compositions result after stoving in highly weather-resistant coatings with reproducible and adjustable matt effects, the special crosslinking agent mixtures containing both carboxyl groups and blocked isocyanate groups can only be produced in an elaborate and costly process in solution with a subsequent evaporation step.

The same also applies to the ε-caprolactam blocked urea polyisocyanates which are described in DE-A 3,739,479 as crosslinking agents for matt polyurethane powder coatings. The synthesis of these blocked urea polyisocyanates, which are prepared by reacting partially blocked diisocyanates with diamines or polyamines, must be carried out in solution. However, because of the known extremely high reactivity of isocyanate groups with aliphatic amines, the production process described can only be achieved with difficulty on a commercial scale.

According to the teachings of EP-A 553,750, powder coating compositions based on a mixture of two hydroxyl polyesters having different OH numbers and reactivity also produce matt polyurethane coatings in combination with commercially available uretdione crosslinking agents which are based on IPDI and do not split off volatile decomposition products. However, this process is restricted to the use of very special polyester polyols and cannot be readily applied to all binding agents.

An object of the present invention is to provide new polyurethane powder coating compositions which cure to form solvent resistant and chemical resistant coatings with reproducible and adjustable low degrees of gloss.

These objects may be achieved with the powder coating compositions according to the present invention. The invention is based on the surprising observation that polyurethane powder coating compositions based on a polyester polyol and a crosslinking agent containing blocked isocyanate groups, which generally form extremely glossy coating films when stoved, result in totally matt coatings if a crosslinking agent having carboxyl groups and/or carboxylic anhydride groups and an additional crosslinking agent having groups that are reactive with carboxyl groups and/or carboxylic anhydride groups is added to the formulation and all of the components are homogenized by melt extrusion.

That the compositions according to the invention result in matt coatings is surprising, since powder coating compositions containing a polyester polyol, a blocked polyisocyanate and only one additional crosslinking agent, i.e., either a crosslinking agent having carboxyl groups and/or carboxylic anhydride groups or a crosslinking agent having groups that are reactive with carboxyl groups and/or carboxylic anhydride groups, produce extremely glossy coatings. It is also surprising because a composition containing a component having carboxyl groups and/or carboxylic anhydride groups and a component having groups that are reactive with carboxyl groups and/or carboxylic anhydride groups results in a glossy film.

In view of these results it was totally unexpected that the powder coating compositions according to the invention, which are described more fully below, cure to form matt coatings, in particular, because it is known that the addition of a mixture of a high molecular weight component having carboxyl groups and a component that is reactive with this component, for example, a polyepoxide crosslinking agent, to a polyurethane powder coating composition also produces a glossy coating. Regardless of the disadvantages previously discussed, it is possible to produce matt powder coatings in accordance with the process described, for example, in DE-A 2,147,653 and 2,247,779, by "dry" mixing and subsequent joint grinding of two separately formulated powder coating compositions that are chemically different and have different reactivities, for example, a polyurethane powder coating composition and a second powder coating composition, based on a carboxyl polyester and a polyepoxide crosslinking agent. However, the homogenization of these two reactive systems by melt extrusion always results in powder coatings that are extremely glossy.

SUMMARY OF THE INVENTION

The present invention relates to a powder coating composition for the production of matt coatings containing as binder A) a component having hydroxyl groups, which is solid below 40° C. and liquid above 130° C., and has an OH number of 25 to 200 and a number average molecular weight of 400 to 10,000, B) a polyisocyanate having blocked and optionally free isocyanate groups which is solid below 40° C. and liquid above 125° C. and is based on aliphatic and/or cycloaliphatic diisocyanates, C) a component having carboxyl groups and/or carboxylic anhydride groups which is solid below 40° C. and liquid above 160° C. and contains one or more of the following:

C1) aliphatic and/or cycloaliphatic dicarboxylic acids having 4 to 20 carbon atoms, C2) monomeric and/or polymeric anhydrides of dicarboxylic acids C1) and C3) aliphatic hydroxycarboxylic acids having 4 to 18 carbon atoms, and D) a component which has groups that are reactive with carboxyl groups and/or carboxylic anhydride groups and has a number average molecular weight of 200 to 5,000, wherein components A), B), C) and D) are present in amounts such that 1) 0.6 to 1.4 isocyanate groups of component B) are present for each hydroxyl group of component A), in which the isocyanate groups of component B) include both free isocyanate groups and isocyanate groups in blocked form, 2) 0.3 to 1.5 groups of component D) that are reactive with carboxyl groups and/or carboxylic anhydride groups are present for each carboxyl equivalent of component C), in which one carboxyl group corresponds to one carboxyl equivalent and one carboxylic anhydride group corresponds to two carboxyl equivalents and 3) components C) and D) are present in an amount of 10 to 40 wt. %, based on the total weight of components A), B), C) and D).

The invention further relates to heat resistant substrates coated with this powder coating composition.

DETAILED DESCRIPTION OF THE INVENTION

Component A) is selected from compounds containing hydroxyl groups, which are known from powder coating technology, are solid below 40° C. and liquid above 130° C., and have a hydroxyl number of 25 to 200, preferably 30 to 150, a number average molecular weight (which is calculated from the functionality and the hydroxyl group content) of 400 to 10,000, preferably 1,000 to 5,000.

These binding agents include polyesters, polyacrylates and polyurethanes containing hydroxyl groups, such as those described in EP-A 45,998 (U.S. Pat. No. 4,463,154, herein incorporated by reference) or EP-A 254,152 (U.S. Pat. No. 4,900,800, herein incorporated by reference).

Component A) is preferably has a softening temperature, which is determined by differential thermoanalysis (DTA), of 40° to 120° C., more preferably 45° to 110° C., and is preferably a polyester containing hydroxyl groups.

Component B) is selected from blocked polyisocyanates which are known from powder coating technology as crosslinking agents for hydroxy-functional binding agents. These blocked polyisocyanates are based on aliphatic and/or cycloaliphatic diisocyanates, are solid below 40° C. and liquid above 125° C., have a content of blocked isocyanate groups (calculated as NCO; molecular weight =42) of 5 to 20 wt. %, preferably 8 to 17 wt. %, and have a content of free isocyanate groups of less than 2 wt. %, preferably less than 1 wt. %, and which.

The production of these blocked polyisocyanate crosslinking agents by reacting polyisocyanates with blocking agents that have monofunctional reactivity with isocyanate groups is known.

Suitable starting materials for preparing the blocked polyisocyanates include aliphatic or cycloaliphatic diisocyanates, such as 1,4-butane diisocyanate (BDI), 1,6-hexamethylene diisocyanate (HDI), 1-isocyanato-3,3,5-trimethyl-5-isocyanatomethylcyclohexane (isophorone diisocyanate or IPDI), 4,4'-diisocyanatodicyclohexylmethane, 2,4- and/or 2,6-diisocyanato-1-methylcyclohexane, 1,4-diisocyanatocyclohexane and mixtures of these diisocyanates. Diisocyanates having aryl structures are also regarded as aliphatic or cycloaliphatic diisocyanates, provided that their isocyanate groups are bound to alkyl or cycloalkyl carbon atoms and not directly to the aromatic carbon atoms. Examples of these diisocyanates include 1,3- or 1,4-bis(isocyanatomethyl)benzene and 1,3- or 1,4-bis(2-isocyanatoprop-2-yl)benzene.

Suitable blocking agents include the blocking agents which are known from polyurethane chemistry and which have monofunctional reactivity with isocyanate groups.

Also suitable as component B) are derivatives of IPDI that are blocked with $\epsilon$-caprolactam, such as those described in DE-A 2,105,777, 2,542,191, 3,143,060, 2,735,497 and 2,842,641; urethanes or isocyanurates of 1,4-diisocyanatocyclohexane that are blocked with $\epsilon$-caprolactam as described, e.g., in EP-A 286 799; and simple diisocyanates blocked with , $\epsilon$-caprolactam, such as 1,4-disocyanatocyclohexane (EP-A 218,040), 4,4'-diisocyanatodicyclohexylmethane (EP-A 460,963), 1,3-bis (isocyanatomethyl)benzene (DE-A 2,801,126) and 1,3- or 1,4-bis(2-isocyanatoprop-2-yl)benzene (EP-A 403,779, WO 91/15532). In addition, polyisocyanates blocked with ketoximes, for example, IPDI or 4,4'-diisocyanatodicyclohexylmethane blocked with butanone oxime (U.S. Pat. No. 3,857,818); 1,4-bis-(isocyanatomethyl)benzene blocked with acetone oxime (U.S. Pat. No. 4,375,539); IPDI, 4,4'-diisocyanatodicyclohexylmethane or 1,3- or 1,4-bis(2-isocyanatoprop-2-yl)benzene blocked with diisopropyl ketoxime or diisobutyl ketoxime (EP-A 409,745); and polyisocyanates blocked with triazolene (DE-A 2,812,252), cyclic amidines (DE-A 2,946,085) or secondary amines (DE-A 3,434,881) may also be used as component B).

Preferred blocked polyisocyanates B) are those based on IPDI, 4,4'-diisocyanatodicyclohexylmethane or 2,4- and/or 2,6-diisocyanato-1-methylcyclohexane with ε-caprolactam as blocking agent.

Component B) is used in the powder coating compositions according to the invention in amounts such that 0.6 to 1.4, preferably 0.8 to 1.2 isocyanate groups of component B) are present for each hydroxyl group of component A). The isocyanate groups of component B) are understood to mean the sum of isocyanate groups that are present in blocked form and those present as free isocyanate groups.

Component C) is selected from components having carboxyl groups and/or carboxylic anhydride groups and contains one or more of C1) aliphatic and/or cycloaliphatic dicarboxylic acids having 4 to 20 carbon atoms, C2) monomeric and/or polymeric anhydrides of dicarboxylic acids C1) which may optionally be modified and C3) aliphatic hydroxycarboxylic acids having 4 to 18 carbon atoms.

Suitable dicarboxylic acids C1) include succinic acid, glutaric acid, adipic acid, pimelic acid, suberic acid, azelaic acid, sebacic acid, dodecanedioic acid (1,10-decanedicarboxylic acid) and hexahydrophthalic acid.

Components C2) include monomeric anhydrides of dicarboxylic acids C1), such as succinic anhydride, glutaric anhydride and hexahydrophthalic anhydride, and polymeric anhydrides of dicarboxylic acids C1), such as those obtained by intramolecular condensation of the named acids, and mixtures thereof. Examples include adipic (poly)anhydride, azelaic (poly)anhydride, sebacic (poly)anhydride and dodecanedioic (poly)anhydride. The weight average molecular weight ($M_w$) of these polyanhydrides (which may be determined by gel-permeation chromatography using polystyrene as standard) is preferably 1,000 to 5,000. The polyanhydrides are produced, for example, by reacting the dicarboxylic acids with acetic anhydride at temperatures of 120° to 200° C., preferably 120° to 170° C. The acetic acid that is dissociated in the process is removed, for example, by distillation under vacuum.

Components C2) also includes modified anhydrides of dicarboxylic acids C1), for example, polyol-modified polyanhydrides such as those described in EP-A 299,420. In these polyol-modified polyanhydrides the molar ratio of anhydride groups to carboxyl groups is generally 0.04:1 to 5:1, preferably 1:1 to 3:1. Also suitable as component C2) are polyisocyanate-modified polyanhydrides, such as those described in DE-A 4,427,225 and prepared by reacting dicarboxylic acids and/or dicarboxylic (poly)anhydrides with organic polyisocyanates and optionally compounds having additional amino and/or hydroxyl groups that are reactive with anhydride groups.

Such polyisocyanate-modified dicarboxylic (poly)anhydrides generally have a content of carboxyl groups (calculated as $CO_2H$; molecular weight=45) of 0.5 to 30 wt. %, a content of carboxylic anhydride groups (calculated as $C_2O_3$; molecular weight=72) of 5 to 35 wt. % and a nitrogen content present as amide and/or urea groups of 0.2 to 8 wt. %.

Suitable hydroxycarboxylic acids C3) are those which have a melting point between 40° and 150° C. These include 2-hydroxyisobutyric acid (81° C.), 2-hydroxyhexanoic acid (61° C.), 10-hydroxydecanoic acid (76° C.), 12-hydroxydodecanoic acid (86° C.), 16-hydroxyhexadecanoic acid (98° C.) and 12-hydroxyoctadecanoic acid (80° C.). These hydroxycarboxylic acids are preferably only used in combination with unmodified polyanhydrides C2), which are preferably unmodified, in an amount of up to 50 wt. %, based on the weight of the polyanhydrides.

It is particularly preferred that component C) consists exclusively of at least one saturated aliphatic dicarboxylic acid having 4 to 12 carbon atoms, a monomeric or polymeric anhydride of such dicarboxylic acids or a polyanhydride of such dicarboxylic acids that is modified by aliphatic and/or cycloaliphatic polyisocyanates.

Component D) is selected from compounds having groups that are reactive with carboxyl groups and/or carboxylic anhydride groups and having a number average molecular weight (which is calculated from the functionality and the hydroxyl group content) of 200 to 5,000, preferably 200 to 2,000 and more preferably 250 to 1,000. These compounds are known from powder coating technology as crosslinking agents for powder coating binding agents containing carboxyl groups.

Suitable components D) include the known polyepoxides such as triglycidyl isocyanurate (TGIC) and triglycidyl urazole or the oligomers thereof, glycidyl ethers such as those based on bisphenol A, glycidyl esters such as those based on phthalic acid, tetrahydrophthalic acid and hexahydrophthalic acid, and mixtures of these polyepoxides.

Also suitable as component D) are compounds having β-hydroxyalkylamide groups, such as those described in EP-A 322,834 as crosslinking agents for polyesters containing carboxyl groups. Such 1-hydroxyalkylamides are generally produced by the base-catalyzed reaction of organic polycarboxylic esters with β-hydroxyalkylamines at temperatures of up to 200° C. with simultaneous distillative removal of the alcohol that is formed in the process.

Component D) is preferably based on TGIC or β-hydroxyalkylamides prepared from saturated dicarboxylic esters having 4 to 12 carbon atoms in the dicarboxylic acid component. More preferably, component D) is a β-hydroxyalkylamide obtained by reacting diethanolamine with a mixture of adipic dimethyl ester and glutaric dimethyl ester.

Component D) is used in the powder coating compositions according to the invention in an amount such that 0.3 to 1.5, preferably 0.4 to 1.2, groups of component D) that are reactive with carboxyl groups and/or carboxylic anhydride groups are present for each carboxyl equivalent of component C). For these purposes one carboxyl group corresponds to one carboxyl equivalent and one carboxylic anhydride group corresponds to two carboxyl equivalents.

Components C) and D) are present in the coating compositions according to the invention in an amount of 10 to 40 wt. %, preferably 15 to 35 wt. %, base on the total weight of components A), B), C) and D).

The powder coating composition according to the invention may optionally also contain additives which are known in powder coating technology. These include catalysts such as tin(II) hexanoate, tin(II) octanoate, tin(II) laurate, dibutyltin oxide, dibutyltin chloride, dibutyltin diacetate, dibutyltin laurate, dibutyltin maleate, dioctyltin diacetate, 1,4-diaza-bicyclo[2.2.2]octane, 1,5-diazyabicyclo[4.3.0]none-5-ene, 1,8-diazabicyclo[5.4.0]-undec-7-ene, and mixtures of these and other catalysts. Other suitable catalysts as well as details concerning catalyst mechanisms are described, for example, in the Kunststoffhandbuch, Volume VII, published by Vieweg and Höchtlen, Carl-Hanser Verlag, München 1966, pages 96 to 102. The catalysts are used, if at all, in an amount of 0.1 to 5 wt. %, preferably 0.1 to 3 wt. %, based on the weight of components A), B), C) and D).

Other additives E) include flow-control agents such as polybutyl acrylate or those based on polysilicones, light stabilizers such as sterically hindered amines, UV absorbers such as benzotriazoles or benzophenones and pigments such as titanium dioxide.

Additives E) also include color stabilizers to counter the risk of yellowing due to overstoving. Examples include trialkyl and/or triaryl phosphites wherein the alkyl substituents have 6 to 12 carbon atoms (which may have inert substituents), such as triethyl phosphite, triphenyl phosphite or preferably trisalkylphenyl phosphites. Particularly preferred is trisnonylphenyl phosphite (a technical product consisting essentially of an ester of phosphoric acid with the addition product of tripropylene on phenol).

In order to produce the finished powder coating composition, components A, B), C), D) and optionally E) are mixed intimately with one another and then combined in a melt to form a homogeneous material. This can be effected in suitable units, for example heatable kneaders, but is preferably carried out by melt extrusion, whereby the extrusion temperature is generally so chosen that the maximum shearing forces act upon the mixture. However, in order to avoid premature crosslinking of the powder coating composition a maximum temperature of 120° C. should not be exceeded in this process.

The sequence in which individual components A) to E) are combined is not critical. In a preferred embodiment of producing a finished powder coating composition only two of the individual components, preferably only components B) and C), are intimately mixed in a first step with one another in a melt, preferably directly following the production of one of the components B or C), and then, in a second step, the remaining components are added to the resulting homogeneous material, which is stable in storage, and preferably contains components B) and C). The final homogeneous mixture is then extruded.

Regardless of the process chosen the amounts of individual components A), B), C) and D) are as previously set forth. Hydroxyl groups that are optionally present in components C) and/or D) are disregarded in determining the amounts of the various components. The equivalent ratio of isocyanate groups to hydroxyl groups is based exclusively on components A) and B).

After cooling to room temperature and after a suitable preliminary crushing, the extruded mass is ground to form a powder coating composition, and by sieving is freed of particles above the desired grain size, for example, above 0.1 mm.

The resulting powder coating compositions may be applied to the substrates to be coated by conventional powder application processes such as electrostatic powder spraying or whirl sintering. The coatings are cured by heating to a temperature of 120° to 220° C., preferably 130° to 200° C., for example, for about 10 to 30 minutes. Totally matt, hard and elastic coatings are obtained which are characterized by outstanding levelling and also good solvent resistance and resistance to chemicals.

Any heat resistant substrates, such as glass or metals, can be coated with the powder coating compositions according to the invention.

EXAMPLES

All parts and percentages are by weight unless otherwise indicated.

Production of the Initial Components

Blocked Polyisocyanate B-a)

222 parts of 1-isocyanato-3,3,5-trimethyl-5-isocyanatomethylcyclohexane (IPDI) were added to a reaction vessel at about 100° C. and without further heating were mixed at this temperature in portions with 113 parts of $\epsilon$-caprolactam. The exothermic reaction was allowed to proceed at a temperature of 100° to 130° C. and after about 20 minutes of further stirring at this temperature the calculated NCO content of about 12.5% was attained. At about 120° C., 31 parts of ethylene glycol were then added. The melt, which was becoming more viscous, was then stirred further at this temperature for about 3 hours until the content of free NCO groups was less than 0.5% and remained constant. The melt was poured onto a metal sheet to cool, and a practically colorless solid resin was obtained, which was stable in storage and had a melting point—determined by differential thermoanalysis (DTA)-of about 65° C., a content of blocked NCO groups (calculated as NCO; molecular weight=42) of 11.5% and a content of free NCO groups of 0.4%.

Blocked Polyisocyanate B-b)

524 parts of 4,4'-diisocyanatodicyclohexylmethane were added to a reaction vessel at about 100° C. and without further heating were mixed at this temperature in portions with 226 parts of $\epsilon$-caprolactam. The exothermic reaction was allowed to proceed at a temperature of 100° to 130° C., and after about 20 minutes of further stirring at this temperature the calculated NCO content of about 11.2% was attained. At about 120° C., 118 parts of 1,6-hexanediol were then added. The melt, which was becoming more viscous, was then stirred further at this temperature for about 3 hours until the content of free NCO groups was less than 0.5% and remained constant. The melt was poured onto a metal sheet to cool, and a bright solid resin was obtained, which was stable in storage and had a melting (DTA) of about 55° C., a content of blocked NCO groups of 9.7% and a content of free NCO groups of 0.2%.

Blocked Polyisocyanate B-c)

To 3,144 parts of 4,4'-diisocyanatodicyclohexylmethane in a reaction vessel under nitrogen at 60° C. were added 9 parts of a 15% catalyst solution of benzyltrimethylammoniumhydroxide in 2-ethyl-1-hexanol. The temperature of the reaction mixture was maintained at 65° to 70° C. until the NCO content had fallen by catalytic trimerization to a value of about 23%, which took about 90 min. The reaction was stopped by additing 3 parts of bis(2-ethylhexyl)phosphate and heating to a temperature of 100° C. After a further stirring time of about 60 min at 100° C., 1,995 parts of $\epsilon$-caprolactam were added in portions without additional heating at this temperature. Towards the end of the addition, the reaction mixture, which was becoming more viscous, was heated up to 135° to 140° C. and stirred further for about 40 min until the free isocyanate group content had fallen to less than 0.7%. The melt was poured onto a metal sheet to cool, and a colorless solid resin was obtained, which was stable in storage and had a melting point (DTA) of about 50° C., a content of blocked NCO groups of 14.2% and a content of free NCO groups of 0.5%.

Blocked Polyisocyanate B-d)

360 parts of a diisocyanate mixture, which contained 80% of 2,4-diisocyanato-1-methyldicyclohexane and 20% of 2,6-diisocyanato-1-methylcyclohexane, were added to a reaction vessel at about 100° C and without further heating at this temperature were mixed in portions with 226 parts of ε-caprolactam. The exothermic reaction was allowed to proceed at a temperature of 100° to 130° C. and after about 20 minutes of further stirring at this temperature the calculated NCO content of about 14.3% was attained. At about 120° C., 65 parts of 1,6-hexanediol and 40 parts of trimethylolpropane (TMP) were then added. The melt, which was becoming more viscous, was then stirred further at this temperature for about 3 hours until the content of free NCO groups was less than 0.1% and remained constant. The melt was poured onto a metal sheet and cooled, and a bright solid resin was obtained, which was stable in storage and had a melting point (DTA) of about 55° C., a content of blocked NCO groups of 12.2% and a content of free NCO groups of 0.7%.

Polyisocyanate-modified Polyanhydride C2-a)

1,000 parts of dodecanedioic acid were mixed under nitrogen with 240 parts of acetic anhydride and 200 parts of a isocyanurate group-containing polyisocyanate prepared from hexamethylene diisocyanate and having an isocyanate content of 21.5% and a viscosity at 23° C. of 3,000 mpa.s and also 240 parts of acetic anhydride. The mixture was heated to 125° C. and stirred for 4 h at this temperature. The acetic acid formed was distilled off in a weak current of $N_2$ and a colorless crystalline product was obtained having a melting range (DTA) from 84° to 104° C., a content of carboxyl groups (calculated as $CO_2H$; molecular weight= 45) of 11.8%, a content of carboxylic anhydride groups (calculated as $C_2O_3$; molecular weight=72) of 15.6% and a nitrogen content in the form of amide groups and/or urea groups of 1.3%. The equivalent weight was calculated as 144 g per carboxyl equivalent.

β-Hydroxyalkylamide D-a)

900 parts of adipic dimethyl ester were mixed with 100 parts of glutaric dimethyl ester, 1,460 parts of diethanolamine and 5 parts of potassium hydroxide in a mixing vessel with distillation head and heated to a temperature of 100° to 110° C. Methanol, which was formed in the process, was distilled from the reaction mixture. After about 200 parts of methanol had been separated, a vacuum of about 150 mbar was applied to the reaction apparatus, whereupon a further 100 parts of methanol was distilled off.

The distillation bridge was then removed and the reaction mixture was mixed with 350 parts of fresh methanol and 2 liters of acetone. The precipitate that was deposited was drawn off by suction, washed with acetone and dried. A pale yellow powder was obtained having a melting point between 118° and 1200° C. The equivalent weight was 80 g per equivalent of hydroxyethylamine groups.

Example 1

38.8 parts of a polyester containing hydroxyl groups (prepared from 66.6 parts of terephthalic acid, 38.2 parts of neopentyl glycol, 5.3 parts of 1,6-hexanediol and 4.5 parts of 1,1,1-trimethylolpropane and having an OH number of 50 and a melting range (DTA) of 55° to 60° C.) were thoroughly mixed with 12.2 parts of blocked polyisocyanate B-a), which corresponded to an NCO/OH equivalent ratio of 1:1.

7.0 parts of dodecanedioic acid and 5.0 parts of the β-hydroxylamide D-a) were also added, which corresponded to an equivalent ratio of carboxyl equivalents to groups that are reactive with carboxyl groups and/or carboxylic anhydride groups of 1:1. 1.0 part of a commercial flow-control agent based on polybutyl acrylate (Modaflow PIII; Monsanto), 1.0 part of tin(II) octanoate catalyst, 1.1 parts of furnace black (Flammruβ 101; Degussa), and 33.9 parts of a commercial filler (Blanc Fix M; Sachtleben) and were then added and homogenized with the aid of a Buss Cokneter (co-kneader) of type PLK 46 at 150 rpm and a casing temperature of 60° C. in the intake region and also on the shaft and 100° C. in the processing part, such that mass temperatures of 90° to 100° C. were attained. The solidified melt was ground and sieved with the aid of an ACM2 separator mill (Hosokawa Mikropul) having a 90 μm sieve. The resulting powder was sprayed using an ESB cup gun at a high voltage of 70 kV onto a degreased steel sheet and cured for 30 min at 180° C. to form a smooth, black matt coating.

At a layer thickness of about 65 μm the following coating properties were obtained:

| | | |
|---|---|---|
| ET[a)] | | 9.0 |
| Gloss[b)] | 20° | 0.6 |
| | 60° | 8.0 |
| AC[c)] | DR | 50 |
| | Result | 0–1 |

[a)]ET = Erichsen cupping according to DIN 53 156
[b)]Gloss = gloss according to Gardner, 20° or 60° reflection angle
[c)]AC = acetone test;
DR = number of double rubs with saturated cotton-wool swab
Result =
0 = film intact
1 = film surface slightly softened
2 = film swollen to the bottom Example 2

Using the polyester containing hydroxyl groups and additives described in Example 1, powder coating compositions having the following composition (parts by weight) were produced in accordance with the process described in Example 1.

| Example | | 2 | 3 | 4 | 5 comp | 6 comp. |
|---|---|---|---|---|---|---|
| Polyester acc. to Example 1 | | 37.0 | 40.6 | 38.0 | 43.4 | 44.1 |
| Blocked polyisocyanate | B-a) | — | — | — | 13.6 | 13.9 |
| | B-b) | 14.0 | — | — | — | — |
| | B-c) | — | 10.4 | — | — | — |
| | B-d) | — | — | 11.0 | — | — |
| Polyanhydride | C2-a) | — | — | 9.0 | 6.0 | — |
| Dodecanedioic acid | | 7.0 | 7.0 | — | — | — |
| β-hydroxyalkyl amide | D-a) | 5.0 | 5.0 | 5.0 | — | 5.0 |
| Flow aid | | 1.0 | 1.0 | 1.0 | 1.0 | 1.0 |
| Tin(II) octanoate | | 1.0 | 1.0 | 1.0 | 1.0 | 1.0 |
| Furnace black | | 1.1 | 1.1 | 1.1 | 1.1 | 1.1 |
| Inert filler | | 33.9 | 33.9 | 33.9 | 33.9 | 33.9 |

The powders were sprayed using an ESB cup gun at a high voltage of 70 kV onto degreased steel sheets and in each case were cured for 30 min at 180° C. At layer thicknesses of 60±5 μm the following coating properties were found:

|  | 2 | 3 | 4 | 5 comp | 6 comp |
|---|---|---|---|---|---|
| ET[a] |  | >9.0 | 9.0 | 9.0 | 1.0 | 0.5 |
| Gloss[b] 20° | 0.4 | 3.1 | 2.2 | 36 | 31 |
| 60° | 6.3 | 28 | 18 | 79 | 77 |
| Ac[c] DR | 50 | 50 | 50 | 50 | 50 |
| Result | 0–1 | 1 | 1 | 2 m | 2 m |

[a]ET = Erichsen cupping according to DIN 53 156
[b]Gloss = gloss according to Gardner, 20° or 60° reflection angle
[c]AC = acetone test;
DR = number of double rubs with saturated cotton-wool swab
Verdict =
0 = film intact
1 = film surface slightly softened
2 = film swollen to the bottom
m = matt (loss of gloss)

The comparative examples show that the addition of only one additional component, i.e., a component having carboxyl groups and/or carboxylic anhydride groups (Comparative Example 5) or a component having groups that are reactive with carboxyl groups and/or carboxylic anhydride groups (Comparative Example 6) to a polyurethane system consisting of a polyester polyol and a blocked polyisocyanate results in coatings which were not matt and which exhibit only moderate elasticities and resistance properties.

Example 7 (Comparison)

36.5 parts of the polyester containing hydroxyl groups described in Example 1, 11.5 parts of the blocked polyisocyanate B-a) (which corresponded to an NCO/OH equivalent ratio of 1:1), 14.7 parts of a polyester containing carboxyl groups (prepared from 44.8 parts of terephthalic acid, 6.8 parts of isophthalic acid, 48.9 parts of neopentyl glycol and 0.5 parts of pentaerythritol and having an acid number of 15.5 and a melting range (DTA) of 65° to 70° C.) and 0.3 parts of β-hydroxyalkylamide D-a), (which corresponded to an equivalent ratio of carboxyl groups to groups that are reactive with carboxyl groups of 1:1), were used to prepare a black-pigmented powder coating composition according to the process described in Example 1. The coating composition also contained 1.0 part of the flow aid and 1.0 part of the inert filler described in Example 1.

The powder was sprayed using an ESB cup gun at a high voltage of 70 kV onto a degreased steel sheet and cured for 30 min at 180° C. A black glossy coating film was obtained, which at a layer thickness of about 60 μm, had the following properties:

| ET[a] |  | 9.0 |
|---|---|---|
| Gloss[b] | 20° | 59 |
|  | 60° | 86 |
| AC[c] | DR | 50 |
|  | Result | 2 m |

[a]ET = Erichsen cupping according to DIN 53 156
[b]Gloss = gloss according to Gardner, 20° or 60° reflection angle
[c]AC = acetone test;
DR = number of double rubs with saturated cotton-wool swab
Verdict =
0 = film intact
1 = film surface slightly softened
2 = film swollen to the bottom
m = matt (loss of gloss)

This comparative example demonstrates that the addition of a combination of a high molecular weight carboxyl polyester and a crosslinking agent that was reactive with carboxyl groups to a polyurethane system containing a polyester and a blocked polyisocyanate does not result in a matt coating, but rather in a glossy coating which has only moderate solvent resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A powder coating composition for the production of matt coatings in which the binder comprises
    A) a component having hydroxyl groups, which is solid below 40° C. and liquid above 130° C., and has an OH number of 25 to 200 and a number average molecular weight of 400 to 10,000,
    B) a polyisocyanate having blocked and optionally free isocyanate groups which is solid below 40° C. and liquid above 125° C. and is based on aliphatic and/or cycloaliphatic diisocyanates,
    C) a component having carboxyl groups and/or carboxylic anhydride groups which is solid below 40° C. and liquid above 160° C. and comprises one or more of the following:
        C1) aliphatic and/or cycloaliphatic dicarboxylic acids having 4 to 20 carbon atoms and
        C2) monomeric and/or polymeric anhydrides of dicarboxylic acids C1) and
    D) a component which has groups that are reactive with carboxyl groups and/or carboxylic anhydride groups and has a number average molecular weight of 200 to 5,000,
    wherein components A), B), C) and D) are present in amounts such that
    1) 0.6 to 1.4 isocyanate groups of component B) are present for each hydroxyl group of component A), in which the isocyanate groups of component B) include both free isocyanate groups and isocyanate groups in blocked form,
    2) 0.3 to 1.5 groups of component D) that are reactive with carboxyl groups and/or carboxylic anhydride groups are present for each carboxyl equivalent of component C), in which one carboxyl group corresponds to one carboxyl equivalent and one carboxylic anhydride group corresponds to two carboxyl equivalents and
    3) components C) and D) are present in an amount of 10 to 40 wt. %, based on the total weight of components A), B), C) and D).

2. The powder coating composition of claim 1 wherein said component A) is a polyester polyol which has a softening temperature (DTA) of 40° to 120° C. and a number average molecular weight of 1,000 to 5,000.

3. The powder coating composition of claim 1 wherein polyisocyanate B) has a content of blocked isocyanate groups of 8 to 17 wt. % and a content of free isocyanate groups of less than 1 wt. %.

4. The powder coating composition of claim 1 wherein polyisocyanate B) is based on a diisocyanate comprising a member selected from the group consisting of isophorone diisocyanate, 4,4'-diisocyanatodicyclohexylmethane, and 2,4- and 2,6-diisocyanato-1-methylcyclohexane.

5. The powder coating composition of claim 1 wherein component C) consists essentially of at least one saturated aliphatic dicarboxylic acid having 4 to 12 carbon atoms.

6. The powder coating composition of claim 1 wherein component C) consists essentially of at least one monomeric or polymeric anhydride of a saturated aliphatic dicarboxylic acid having 4 to 12 carbon atoms.

7. The powder coating composition of claim 1 wherein component C) consists essentially of at least one polyisocyanate-modified dicarboxylic (poly)anhydride prepared from a saturated aliphatic dicarboxylic acid having 4 to 12 carbon atoms and having a content of carboxyl groups (calculated as $CO_2H$; molecular weight=45) of 0.5 to 30 wt. %, a content of carboxylic anhydride groups (calculated as $C_2O_3$; molecular weight=72) of 5 to 35 wt. % and a nitrogen content present in the form of amide and/or urea groups of 0.2 to 8 wt. %.

8. The powder coating composition of claim 1 wherein component D) consists essentially of triglycidyl isocyanurate, its oligomers or a β-hydroxyalkylamide based on a saturated dicarboxylic acid having 4 to 12 carbon atoms.

9. The powder coating composition of claim 1 wherein component D) consists essentially of a β-hydroxyalkylamide based on the reaction product of diethanolamine and a mixture of adipic dimethyl ester and glutaric dimethyl ester.

10. A powder coating composition for the production of matt coatings in which the binder comprises A) a component having hydroxyl groups, which is solid below 40° C. and liquid above 120° C., and has an OH number of 25 to 200 and a number average molecular weight of 1000 to 5000, B) a polyisocyanate having blocked and optionally free isocyanate groups which is solid below 40° C. and liquid above 125° C., is based on aliphatic and/or cycloaliphatic diisocyanates and has a content of blocked isocyanate groups of 8 to 17 wt. % and a content of free isocyanate groups of less than 1 wt. %, C) a component having carboxyl groups and/or carboxylic anhydride groups which is solid below 40° C. and liquid above 160° C. and comprises one or more of the following:
    C1) aliphatic and/or cycloaliphatic dicarboxylic acids having 4 to 20 carbon atoms and
    C2) monomeric and/or polymeric anhydrides of dicarboxylic acids C1) and D) a component which has groups that are reactive with carboxyl groups and/or carboxylic anhydride groups, has a number average molecular weight of 200 to 5,000 and comprises a member selected from the group consisting of triglycidyl isocyanurate, its oligomers and a β-hydroxyalkylamide based on a saturated dicarboxylic acid having 4 to 12 carbon atoms, wherein components A), B), C) and D) are present in amounts such that 1) 0.6 to 1.4 isocyanate groups of component B) are present for each hydroxyl group of component A), in which the isocyanate groups of component B) include both free isocyanate groups and isocyanate groups in blocked form, 2) 0.3 to 1.5 groups of component D) that are reactive with carboxyl groups and/or carboxylic anhydride groups are present for each carboxyl equivalent of component C), in which one carboxyl group corresponds to one carboxyl equivalent and one carboxylic anhydride group corresponds to two carboxyl equivalents and 3) components C) and D) are present in an amount of 10 to 40 wt. %, based on the total weight of components A), B), C) and D).

11. The powder coating composition of claim 10 wherein polyisocyanate B) is based on a diisocyanate comprising a member selected from the group consisting of isophorone diisocyanate, 4,4'-diisocyanatodicyclohexylmethane, and 2,4- and 2,6-diisocyanato-1-methylcyclohexane.

12. The powder coating composition of claim 10 wherein component C) consists essentially of at least one saturated aliphatic dicarboxylic acid having 4 to 12 carbon atoms.

13. The powder coating composition of claim 10 wherein component C) consists essentially of at least one monomeric or polymeric anhydride of a saturated aliphatic dicarboxylic acid having 4 to 12 carbon atoms.

14. The powder coating composition of claim 10 wherein component C) consists essentially of at least one polyisocyanate-modified dicarboxylic (poly)anhydride prepared from a saturated aliphatic dicarboxylic acid having 4 to 12 carbon atoms and having a content of carboxyl groups (calculated as $CO_2H$; molecular weight=45) of 0.5 to 30 wt. %, a content of carboxylic anhydride groups (calculated as $C_2O_3$; molecular weight=72) of 5 to 35 wt. % and a nitrogen content present in the form of amide and/or urea groups of 0.2 to 8 wt. %.

15. The powder coating composition of claim 11 wherein component C) consists essentially of at least one saturated aliphatic dicarboxylic acid having 4 to 12 carbon atoms.

16. The powder coating composition of claim 11 wherein component C) consists essentially of at least one monomeric or polymeric anhydride of a saturated aliphatic dicarboxylic acid having 4 to 12 carbon atoms.

17. The powder coating composition of claim 11 wherein component C) consists essentially of at least one polyisocyanate-modified dicarboxylic (poly)anhydride prepared from a saturated aliphatic dicarboxylic acid having 4 to 12 carbon atoms and having a content of carboxyl groups (calculated as $CO_2H$; molecular weight=45) of 0.5 to 30 wt. %, a content of carboxylic anhydride groups (calculated as $C_2O_3$; molecular weight=72) of 5 to 35 wt. % and a nitrogen content present in the form of amide and/or urea groups of 0.2 to 8 wt. %.

18. The powder coating composition of claim 10 wherein component D) consists essentially of a β-hydroxyalkylamide based on the reaction product of diethanolamine and a mixture of adipic dimethyl ester and glutaric dimethyl ester.

19. The powder coating composition of claim 11 wherein component D) consists essentially of a β-hydroxyalkylamide based on the reaction product of diethanolamine and a mixture of adipic dimethyl ester and glutaric dimethyl ester.

20. A heat resistant substrate coated with the powder coating composition of claim 1.

* * * * *

REEXAMINATION CERTIFICATE (4019th)

United States Patent [19]
Laas et al.

[11] B1 5,811,190
[45] Certificate Issued Mar. 14, 2000

[54] MATT POLYURETHANE POWDER COATINGS AND THEIR USE FOR COATING HEAT RESISTANT SUBSTRATES

[75] Inventors: Hans Josef Laas, Köln; Hans-Ulrich Meier-Westhues, Leverkusen; Reinhard Halapaap, Odenthal; Ulrich Freudenberg, Pulheim; Hans-Peter Klee, Burscheid, all of Germany

[73] Assignee: Bayer Aktiengesellschaft, Leverkusen, Germany

Reexamination Request:
No. 90/005,321, Apr. 28, 1999

Reexamination Certificate for:
Patent No.: 5,811,190
Issued: Sep. 22, 1998
Appl. No.: 08/794,256
Filed: Jan. 31, 1997

[30] Foreign Application Priority Data

Feb. 8, 1996 [DE] Germany ............ 196 04 581

[51] Int. Cl.$^7$ .............. C08L 33/06; C08L 67/02; C08L 75/04
[52] U.S. Cl. ............ 428/423.1; 525/111; 525/123; 525/124; 525/131; 525/438; 525/440; 525/454; 525/934
[58] Field of Search ............ 428/423.1; 525/111, 525/123, 124, 131, 438, 440, 454, 934

[56] References Cited

U.S. PATENT DOCUMENTS 5,786,419  7/1998  Meier-Westhues ............ 524/590

FOREIGN PATENT DOCUMENTS 2177027  11/1996  Canada .
92/01756  2/1992  WIPO .

*Primary Examiner*—Patricia Short

[57] ABSTRACT

The present invention relates to a powder coating composition for the production of matt coatings containing as binder A) a component having hydroxyl groups,
B) a polyisocyanate having blocked and optionally free isocyanate groups,
C) a component having carboxyl groups and/or carboxylic anhydride groups and contains one or more of the following:
  C1) aliphatic and/or cycloaliphatic dicarboxylic acids having 4 to 20 carbon atoms,
  C2) monomeric and/or polymetric anhydrides of dicarboxylic acids C1) and
  C3) aliphatic hydroxycarboxylic acids having 4 to 18 carbon atoms, and
D) a component which has groups that are reactive with carboxyl groups and/or carboxylic anhydride groups wherein components A), B), C) and D) are present in amounts such that
  1) 0.6 to 1.4 isocyanate groups of component B) are present for each hydroxyl group of component A),
  2) 0.3 to 1.5 groups of component D) that are reactive with carboxyl groups and/or carboxylic anhydride groups are present for each carboxyl equivalent of component C) and
  3) components C) and D) are present in an amount of 10 to 40 wt. %, based on the total weight of components A), B), C) and D).

The invention further relates to heat resistant substrates coated with this powder coating composition.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

* * * * *